Dec. 19, 1961

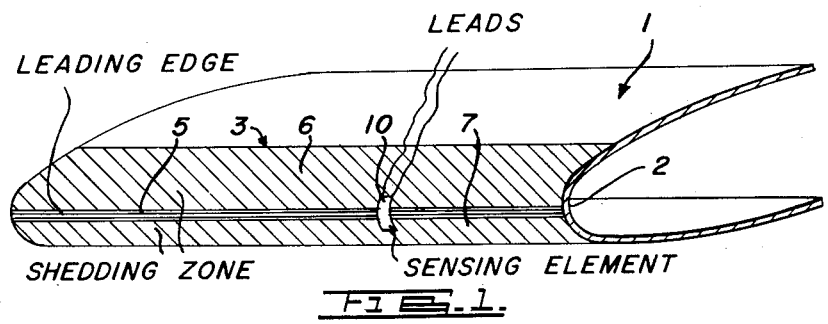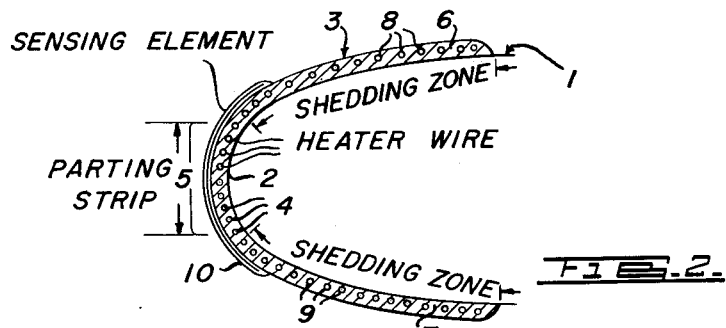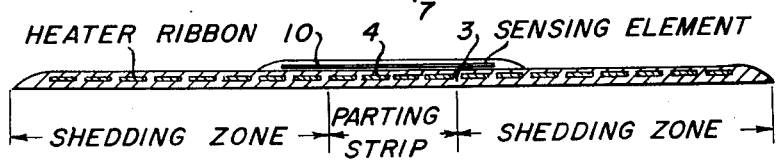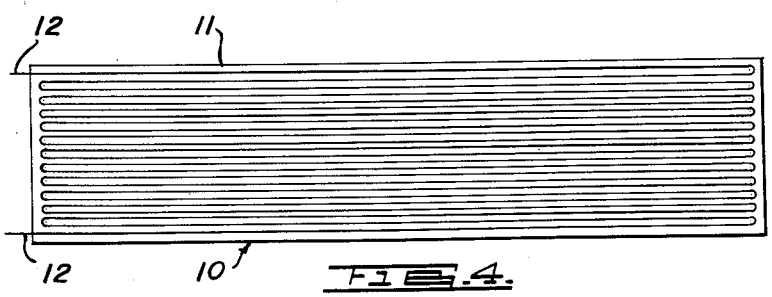

C. K. RUSH
DE-ICING CONTROL 3,013,752

Filed Oct. 1, 1959

INVENTOR
CHARLES K. RUSH
BY *Smart & Biggar*
ATTORNEYS 3,013,752
DE-ICING CONTROL
Charles Kenneth Rush, Ottawa, Ontario, Canada, assignor to National Research Council, Ottawa, Ontario, Canada, a body corporate of Canada
Filed Oct. 1, 1959, Ser. No. 843,759
10 Claims. (Cl. 244—134)

This invention relates to apparatus for controlling the power input to the parting strip of an electrothermal de-icing system for a surface such as the wing of an aircraft.

De-icing systems presently in use operate on the principle that a more or less predetermined amount of ice is allowed to form on certain sections of the surface to be de-iced, whereupon heat is applied, or mechanical or fluid means employed, to reduce the adhesion of the ice to the surface and permit it to break away. In electrothermal de-icing systems adapted for use on aircraft wings it is the practice to locate a parting strip along the region of stagnation of the aerofoil, the term "stagnation" referring to the line along the leading edge of the aerofoil which defines the dividing point between the stream lines which extend over the top and bottom of the aerofoil. Such a parting strip is in the form of a relatively narrow heating element extending along the leading edge of the aeroplane wing at the region thereof at which the line of stagnation will be located for a normal range of positions of the plane in the air. On the upper and lower surfaces of the wing, and extending rearwardly thereon from points immediately adjacent the parting strip region, are so-called "shedding zones." These also comprise heating elements adapted to loosen the adhesion between the ice and the aerofoil, whereupon it is swept off by the air stream. It is the function of the parting strip to maintain, in the area of stagnation, a strip of the aerofoil which is wholly, and continuously, free of ice. When this is accomplished, the air stream is enabled to "lift" the ice located in the shedding areas so as to facilitate its removal. In some instances secondary shedding areas are located farther back on the aerofoil surfaces so as to provide more extensive heated regions and prevent accumulation of ice thereon.

A typical electrothermal de-icing arrangement is as follows. An orifice type icing detector is located at some convenient location, often on the fuselage of the aircraft. When the aircraft enters an area conducive to ice formation, the detector probe orifices are clogged by ice build-up and a cycle of operation begins. The initial actuation of the circuitry associated with the detector probe causes the parting strip element to be placed in operating condition. Once this has been done the parting strip is itself maintained within a specified temperature range, say between 0 and 5° C., so that it is wholly free of ice at all relevant times. This automatic control comprises a cycle of operation, separate from that which causes energization of the shedding zone heater pads, which is brought about by a sensing means located on the parting strip. Conventional design involves use of a sensing element comprising a number of turns of wire fabricated from a material having a relatively high temperature coefficient of resistance. The sensing element "coil" so made is then positioned so that the whole of its temperature-sensitive area is located on the parting strip, at some convenient location therealong. The ends of the coil comprising the sensing element are connected to a Wheatstone bridge circuit so arranged that when the temperature of the sensing element falls to some predetermined lower limit, the heating elements in the parting strip are energized. Correspondingly, when the temperature of the sensing element reaches a predetermined upper limit, the Wheatstone bridge is unbalanced in the other direction and the heating elements of the parting strip are deenergized. This cycle of operation, designed to keep the temperature of the parting strip between relatively close upper and lower limits above the freezing point, continues indefinitely so long as the icing detector arrangement continues to go through cycles of icing and de-icing. Once, however, the detector probe has been de-iced, and fails to become iced again within a specified period of time (say 15 minutes) the energization of the parting strip ceases automatically, regardless of its temperature.

The heating elements located in the shedding areas are actuated directly in accordance with information obtained from the icing detector. In order to permit build-up of an optimum thickness of ice to facilitate proper shedding, the arrangement may be such that the shedding area heaters are energized, for example, once every 10 cycles of detector probe operation. Obviously, as soon as the detector probe ceases to go through cycles of icing and de-icing, energization of the shedding areas will cease. Because simultaneous energization of all the heating elements in the various shedding areas would impose excessive power demands on the aeroplanes generating system, if optimum high level power input to each of the areas was to be used, the shedding areas are usually energized non-simultaneously. The various shedding areas are usually marked by means of "dividing strips" which are extensions of the parting strip and extend across the aerofoil.

The conventional design referred to above, involving the use of a sensing element whose temperature-sensitive surface is wholly located between the edges of the parting strip, at some convenient location therealong, and which is accordingly affected by substantially only the parting strip temperature, results in an electrothermal de-icing system which fails to satisfy three significant design criteria which have recently become apparent. These are as follows.

(1) It has been found that the parting strip temperature should increase as the temperature of the air stream over the aerofoil decreases. With present design procedures it is usual to arrange for a compromise parting strip temperature control so as to deal not only with temperatures near 0° C. but also those appreciably lower. This has the effect that substantial amounts of power are wasted when the aircraft is travelling in ambient temperatures just below the freezing point. The arrangement also promotes a type of ice formation, well back on the shedding areas, which is difficult to shed. It would accordingly be advantageous to arrange an electrothermal de-icing system in which the parting strip temperature is kept within a range directly co-related with that of the air stream passing over the protected surface.

(2) It has also been found that, during shedding of the ice from the shedding areas, the parting strip temperature should be allowed to fall slightly. This is so because, as soon as the shedding area heaters are energized, the temperature gradient between the parting strip and the shedding area heaters falls and there results from this a corresponding decrease in the heat loss from the parting strip. This in turn causes the parting strip to become, on the average, much hotter, particularly at the end of each cycle of operation of the shedding area heaters. Excessively high temperatures in the area over the parting strip facilitates formation of ice well back on the wing of the aircraft where adequate shedding is difficult to obtain. It would, therefore, be advantageous to arrange for the parting strip temperature to fall slightly when the shedding area heaters are energized.

(3) Finally, it has been discovered that it is advantageous to arrange for the parting strip temperature to be higher when it is originally energized than it is during the latter part of the de-icing cycle. This is so because the whole system is completely cold at the beginning of the cycle with a resulting high heat loss by conduction from the parting strip into the region of the shedding zone. This can result in the margins of the parting strip remaining relatively cold and therefore permitting a certain amount of ice accumulation along each edge thereof. In very severe cases the parting strip might become completely bridged over so as to frustrate its proper operation. It would, accordingly, be advantageous to arrange an electrothermal de-icing system in which the parting strip was allowed to attain a somewhat higher than normal operating temperature at the begining of each de-icing cycle.

It is accordingly an object of this invention to provide an electro-thermal de-icing system satisfying each of the three criteria mentioned above.

I have found that the criteria mentioned above can be achieved, and substantially improved operation be obtained, by arranging to control the power input to the heating elements of the parting strip by a temperature sensitive means having at least two temperature sensitive regions and which is adapted to yield data dependent upon the area and temperature of each of the regions. The temperature sensitive means is applied to the heater pad so that one of the regions is located on the parting strip and another of the regions is located on one of the shedding areas. Conventional control arrangement responsive to the temperature sensitive means is used for controlling the power input to the heater elements of the parting strip. Because of the positioning of the temperature sensitive means so that it is responsive to the temperatures of both the parting strip and the shedding area, the power input to the parting strip is controlled in accordance with both these temperatures. In a preferred embodiment of the invention, which will be described hereunder, I provide a temperature sensitive means comprising a plurality of loops of wire having a relatively high temperature coefficient of resistance. The coil thus produced is placed on the heater pad so that it extends across the parting strip with the upper and lower ends thereof being located on regions of the upper and lower shedding areas immediately adjacent the parting strip. Preferably the dimensions of the loops of wire, and location thereof on the heater pad, is such that about one-half of the total temperature sensitive area is located on the parting strip, with one-quarter of the total temperature sensitive area being located on each of the upper and lower shedding areas.

A preferred embodiment of the invention will now be described in detail, with reference to the attached figures of drawings, wherein:

FIGURE 1 is an isometric view of a section of an aerofoil equipped with a heater pad and sensing element arrangement in accordance with the invention;

FIGURE 2 is a cross-sectional view of an aerofoil equipped with a heater pad and sensing element arrangement in accordance with the invention, the particular heater pad shown being of the type using circular wire type heater elements;

FIGURE 3 shows, in "flat" condition, a heater pad using ribbon type elements, upon which a sensing element has been mounted in accordance with the invention;

FIGURE 4 is a top plan view of one form of sensing element which can be used in carrying out the invention.

Figure 5:
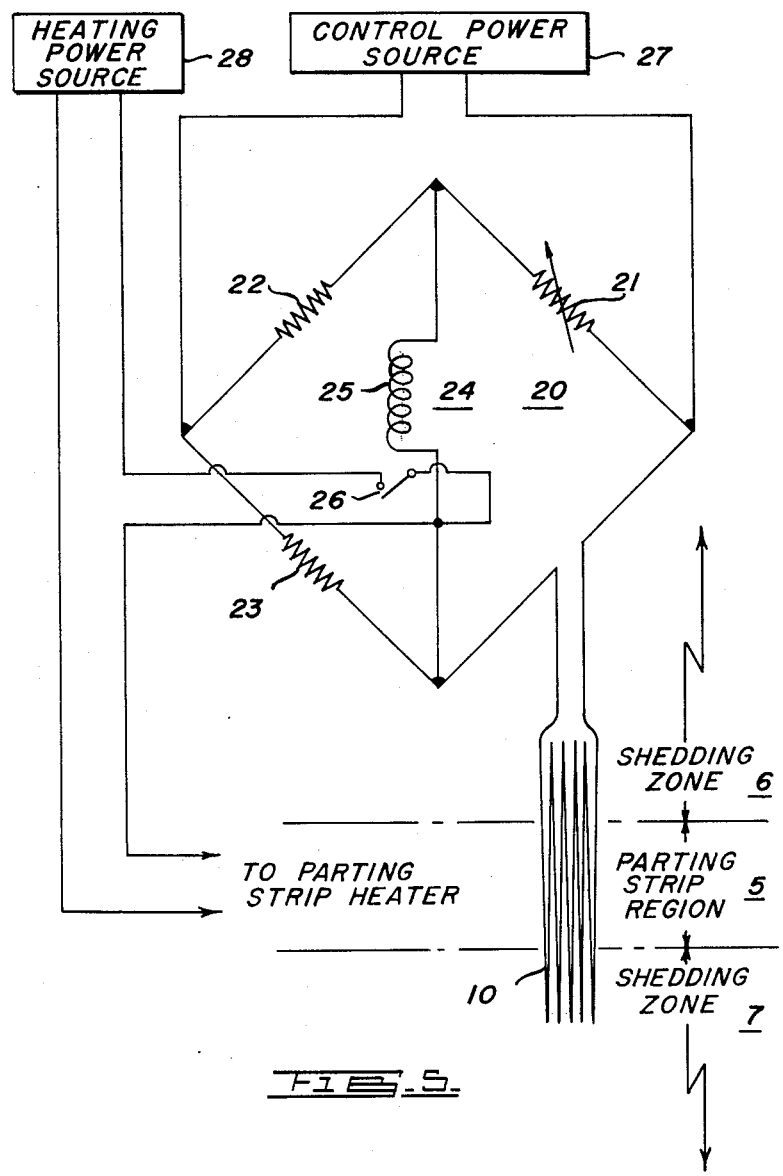
FIGURE 5 is a schematic diagram showing a circuit which can be used to control the power input to the parting strip elements, in accordance with data provided by the temperature sensing element.

Referring now to FIGURES 1 and 2, the reference numeral 1 generally represents an aerofoil having a leading edge 2. A heater pad 3 is mounted around the leading edge 2 as shown; since the present invention is not concerned with the construction of the heater pad per se, no attempt will here be made to describe the details of heater pad design. As can best be seen in FIGURE 2, the elements 4 extending along the length of the heater pad 3 in the central region thereof define a parting strip region, commonly of about one inch in width. The heater pad 3 is applied to the aerofoil 1 so that the parting strip 5 is located in the region of stagnation of the aerofoil, for normal positions of the aircraft. Extending rearwardly from the edges of the parting strip 5, along the upper and lower surfaces of the aerofoil, are the upper and lower shedding surfaces 6 and 7, respectively, having additional heating elements 8 and 9 as best shown in FIGURE 2. Depending on the particular design of the heater pad used, the elements embedded therein may be of the round (commonly braided) wire type such as is illustrated in FIGURE 2, or the ribbon type shown in FIGURE 3.

A temperature sensitive means, generally represented at 10 is, in accordance with the invention, located on the heater pad at some convenient location along its length, so that one temperature sensitive region is located on the parting strip 5, and at least one other temperature sensitive region is located on a shedding area. In the particular embodiment of the invention illustrated in the drawing, the sensing element extends wholly across the parting strip 5 so that its upper and lower ends are located on the upper and lower shedding areas, in regions thereof immediately adjacent the parting strip. Any conventional means can be employed for attaching the temperature sensitive means to the heater pad and its position longitudinally of the aerofoil is not usually critical from a thermal point of view and is likely to be determined by considerations relating to the convenience of making electrical connection from the temperature sensing means to the control circuitry.

One embodiment of the temperature sensitive means is shown in FIGURE 4 and comprises a platform 11 of rectangular shape having on one surface a plurality of loops or "legs" of wire bonded to the platform by any suitable means, as for example a phenolic resin. As can be seen from FIGURE 4, the ends of the coil of wire thus formed are brought out at leads 12 and are adapted to be connected in some suitable manner to the control circuitry associated with the temperature sensing element.

Referring now to FIGURE 5, it will be seen that the temperature sensing means 10 is connected so as to form one side of a Wheatstone bridge circuit generally represented at 20. The other sides of the bridge circuit comprise an adjustable resistor 21, and fixed resistors 22 and 23. Between the junctions of resistor 23 and the temperature sensitive means 10, and the junction of resistor 22 and 21, is connected a polarity sensitive relay 24 having a winding 25 and an armature adapted to close switch 26 when the winding 25 is energized by a current of predetermined magnitude and direction. The opposite corners of the bridge circuit 20 are connected to a control power input 27. Finally, the switch 26 is connected in series with the heating power input source 28 and the parting strip heater elements 4. It will be noted that, in accordance with the invention, the temperature sensitive means 10 shown in FIGURE 5 is located so that about half the temperature sensitive area is located on the parting strip, and the other half is approximately equally divided between the upper and lower shedding regions. The circuit arrangement is such that when the resistance of the temperature sensing means 10 has increased to a predetermined point (control of which is possible by variation of resistor 21), the magnitude and direction of current flow through the winding 25 of relay 24 is such as to cause the armature to open switch 26, thereby cutting off power to the parting strip heater. Conversely, when the resistance of the temperature sensing means 10 falls to a predetermined minimum value, current flow through the coil 25 is such as to cause the armature to close switch 26 and reconnect the parting strip elements to the heating power source 28. Because of the way in which the temperature sensitive means 10 is mounted so that part of its sensitive area is located on the parting strip, and another part is located on at least one of the shedding regions, the resistance between its terminals will be a function of both the parting strip and shedding region temperature.

One particular experimental model of the invention, which was found to have satisfactory operating characteristics, comprised a heating pad of the type sold under the trademark "Iceguard" by the Goodyear Tire & Rubber Company, of Akron, Ohio, having a braid type element embedded in rubber and a parting strip region of about one inch in width. The temperature sensitive means employed comprised 44 legs of 0.00175" diameter wire bonded with phenolic resin to a platform of 2 inches by 5/16 inch comprising 0.0004" thickness of condenser tissue. The type of wire used was a pure grade of nickel having a resistance of 17 ohms per foot and a thermal coefficient of 0.006 per degree C. The leads were of constantan ribbon and the overall resistance of the sensing element was 125 ohms at 72° F. The coil was mounted on the heater pad so that its major dimension transversed the parting strip, with approximately one-half inch at each end of the coil located on the upper and lower shedding areas.

The operation of the invention, and the manner in which its advantages accrue therefrom, are as follows. When the de-icing system of the aircraft is actuated it is clear that the heat loss from the parting strip will be greater as the ambient temperature of the air current falls. A compensating increase in the range of temperature of the parting strip is obtained through use of the invention by reason of the fact that part of the temperature sensitive means is located on one or more shedding zones, the temperature of which is directly affected by the ambient air temperature during the periods of time when the heating elements of the shedding zone are not energized. A fall in the ambient air temperature will therefore cause a fall in the resistance of that part of the temperature sensitive means which is located on the shedding zone. It follows that, for equilibrium of the control circuit to be regained, there must be a compensating increase in temperature (with corresponding increase in resistance) of that part of the temperature sensing means which is located on the parting strip itself. There is accordingly an increased power input to the parting strip heater element with a corresponding increase of the upper and lower limits between which its temperature is allowed to fluctuate.

A fall in the temperature of the parting strip during and after the shedding of ice from the shedding zone is obtained by the change in resistance of the areas of the temperature sensing means located on the shedding zone. As is apparent, when the elements of the shedding zones are energized, those parts of the temperature sensing means located on the shedding zones will increase in temperature. Resistance of the sensing element accordingly increases, and this can be compensated for only by a corresponding decrease in the temperature of that part of the temperature sensing element located on the parting strip, and this in turn requires a lower parting strip power input which is brought about automatically by the control circuitry. This condition will remain in effect until such time as the shedding zone temperature begins to fall.

Finally the relatively high heat loss from the parting strip to the shedding areas when the system is first turned on, caused by the fact that the whole system, and particularly the shedding areas, are cold, is compensated for by increased operating temperatures of the parting strip. This is so because the relatively cold portions of the temperature sensitive means on the shedding areas have relatively low resistance, thus requiring (for current balance) proportionately higher resistance (and accordingly higher temperature) of that portion of the temperature sensing means which is located on the parting strip.

What I claim is:

1. In an electro-thermal de-icing system for an airfoil: a heater pad mounted around the leading edge of the airfoil, said heater pad having heater elements forming a parting strip located substantially along the line of stagnation of the airfoil, heater elements forming an upper shedding area extending from the upper edge of the parting strip rearwardly along the upper surface of the airfoil and further heater elements forming a lower shedding area extending from the lower edge of the parting strip rearwardly along the lower surface of the airfoil, the heater elements of said upper and lower shedding areas being adapted for periodic energization so as to loosen the adhesion of ice to the airfoil; a temperature-sensitive means associated with said heater pad, said temperature-sensitive means having at least two temperature-sensitive regions and adapted to yield data dependent upon the area and temperature of each of said regions, one of said regions being located on said parting strip and another of said regions being located on one of the shedding areas; and means responsive to said temperature-sensitive means for controlling the power input to the heater elements of only the parting strip whereby said power input is controlled in accordance with the temperature of both said regions of the temperature-sensitive means.

2. The invention as claimed in claim 1 wherein the region located on the parting strip comprises about half the total temperature-sensitive area of the temperature-sensitive means.

3. The invention as claimed in claim 1 wherein the temperature-sensitive means has three temperature-sensitive regions, the first of said regions being located on the parting strip, the second on the upper shedding area and the third on the lower shedding area.

4. The invention as claimed in claim 3, wherein the areas of the first, second and third regions are substantially in the ratio of 2, 1 and 1.

5. The invention as claimed in claim 1, wherein the temperature-sensitive means consists of a coil comprising a plurality of loops of wire having a relatively high temperature coefficient of resistance, part of said loops being located on the parting strip, and another part of said loops being located on a shedding area.

6. The invention as claimed in claim 5, wherein one part of said loops is located on the parting strip, a second part on the upper shedding area and a third part on the lower shedding area.

7. The invention as claimed in claim 6, wherein the proportions of the loops on the parting strip, upper shedding area, and lower shedding area, are in about the ratio of 2, 1 and 1, respectively.

8. The invention as claimed in claim 6, wherein the central part of each loop is located on the parting strip, and one end of each loop is located on the upper shedding area immediately adjacent the parting strip, and the other end of each loop is located on the lower shedding area immediately adjacent the parting strip.

9. The invention as claimed in claim 1, wherein the temperature-sensitive means comprises a plurality of loops of wire having a relatively high temperature coefficient of resistance, said loops of wire extending across the parting strip, with the upper and lower ends thereof being respectively located on regions of the upper and lower shedding areas immediately adjacent the parting strip.

10. The invention as claimed in claim 9, wherein approximately one half of the loops is located on the parting strip, and one quarter of the loops is located on each of the upper and lower shedding areas.

References Cited in the file of this patent

UNITED STATES PATENTS

| 2,393,635 | Hubbard | Jan. 29, 1946 |
| 2,767,294 | Fraser et al. | Oct. 16, 1956 |

FOREIGN PATENTS

| 623,503 | Germany | Dec. 24, 1935 |